United States Patent [19]

Bianchi et al.

[11] Patent Number: 4,538,465
[45] Date of Patent: Sep. 3, 1985

[54] ELECTRONIC TRANSMITTER FOR TRANSMITTING PRESSURE VALUES OF INDUSTRIAL PROCESS FLUIDS

[75] Inventors: Gianfranco Bianchi, San Fermo Della Battaglia; Piero Pierpaoli, Lenno; Riccardo Borelli, Tremezzo; Luciano Rainoldi, Lenno, all of Italy

[73] Assignee: Kent-Tieghi S.p.A., Lenno, Italy

[21] Appl. No.: 394,894

[22] Filed: Jul. 2, 1982

[30] Foreign Application Priority Data

Jul. 29, 1981 [IT]  Italy ............................... 23219 A/81

[51] Int. Cl.³ ............................................. G01L 9/10
[52] U.S. Cl. ................................ 73/722; 340/870.31; 336/30
[58] Field of Search ........................ 73/706, 722, 728; 336/30, 134; 340/870.16, 870.31, 870.32

[56] References Cited

U.S. PATENT DOCUMENTS

| | | | |
|---|---|---|---|
| 3,820,400 | 6/1974 | Rosso | 73/722 |
| 3,946,615 | 3/1976 | Hluchan | 73/722 |
| 3,967,504 | 7/1976 | Akeley | 73/722 |
| 3,995,493 | 12/1976 | Nishihara | 73/722 |
| 4,165,653 | 8/1979 | Morehouse | 73/722 |
| 4,365,517 | 12/1982 | Ramel | 73/722 |
| 4,462,258 | 7/1984 | Boddy | 73/706 |

*Primary Examiner*—John W. Caldwell, Sr.
*Assistant Examiner*—Michael F. Heim
*Attorney, Agent, or Firm*—Wenderoth, Lind & Ponack

[57] ABSTRACT

An electronic transmitter for transmitting pressure values of industrial process fluids includes an inductive sensor employing a measuring diaphragm which is movable as a function of the pressure changes in the process fluids so as to produce corresponding changes in inductance and therefore corresponding signals which are suitably processed in an associated electronic circuit. The measuring diaphragm is provided with a rigid center forming or carrying one or more elements of a material exhibiting high magnetic permeability.

12 Claims, 4 Drawing Figures

ELECTRONIC TRANSMITTER FOR TRANSMITTING PRESSURE VALUES OF INDUSTRIAL PROCESS FLUIDS

BACKGROUND OF THE INVENTION

1. Field of Invention

This invention relates to an electronic transmitter for transmitting pressure values of fluids in industrial processes.

2. Description of the Prior Art

Transmitters used for transmitting pressure values and, more specifically, values of pressure changes occurring in industrial processes of any suitable type, are already known. For example, well known in the art are the transmitters of the capacitive type.

A relevant problem not yet satisfactorily solved hitherto in these transmitters is that relating to the provision of means sensitive to the process fluid pressure, more particularly, the measuring diaphragm subjected to the pressure changes. There are two types of diaphragms, namely a convolute diaphragm which is difficult to manufacture and is suitable for large displacement and has a relatively low sensitivity, as well as a flat, unshaped measuring diaphragm which enables short displacements to be performed and has a good sensitivity; this second type of diaphragm must be machined to a maximum of precision and must be mounted in a very accurate manner in the instrument in order to attain the desired results.

The convolute diaphragm has good linearity characteristics even when large displacements are involved. It is usually employed in sensors requiring large displacements of the measuring element (on the order of millimeters) and which do not need to be machined to a high grade of finishing. On the other hand, this diaphragm is very difficult to manufacture and its construction causes some difficulties (reproducibility of both the shape and the elastic characteristics of the diaphragm is difficult).

The flat, unshaped diaphragm has, in general, a bad linearity characteristic for large displacements; this characteristic will, however, be gradually improved if the diaphragm is subjected to small or very small displacements. In this case, however, a very sensitive and accurate sensor has to be used. On the other hand, the flat, unshaped diaphragm has the outstanding advantage of ensuring repeatability of the production operations and, accordingly, of an improved reproducibility and consistency of both the characteristics and the performances of the diaphragm.

A further problem encountered when dealing with the discussed type of transmitters is the protection of the measuring diaphragm against overpressures, the so-called "ever-range".

Also to be taken into consideration is the general structure of the apparatus which has to meet many different requirements at the same time, such as compactness, strength, environmental protection and so on.

Electronic transmitters of pressure values of industrial process fluids are also known, which include an inductive sensor comprising a housing formed of a pair of half-housings defining therebetween an intermediate chamber in which a measuring diaphragm is fitted, which is locked between the two half-housings and directly or indirectly subjected to the process fluid pressures on one or both sides of the measuring diaphragm and having on at least one side of the measuring diaphragm magnetic cores provided with coils each of which is adapted to induce a magnetic field whose inductance changes caused by the gap changes due to the measuring diaphragm movement are processed in an electronic circuit for evaluating the pressure value acting at that time on the measuring diaphragm.

However, these devices, while giving good performances, have disadvantages such as an incomplete linearity response of the measuring diaphragm, a somewhat weak output signal requiring rather complex processing electronics and incomplete safety against process fluid over-pressures which could damage the measuring diaphragm.

SUMMARY OF THE INVENTION

This invention aims to overcome the above difficulties and other disadvantages by providing an electronic transmitter for transmitting pressure values of fluids used in industrial processes of the type formed of a housing having a measuring diaphragm fastened thereto and defining therewith a chamber directly or indirectly subjected to the process fluid pressure acting on the measuring diaphragm, magnetic cores facing the measuring diaphragm and provided with energizing coils each of which is adapted to induce a magnetic field whose inductance changes caused by the air gap changes between the measuring diaphragm and said magnetic coils due to the measuring diaphragm movement are processed in an electronic circuit the output of which represents the pressure value acting at that time on the measuring diaphragm, wherein said measuring diaphragm has a rigid center forming or carrying one or more elements of high magnetic permeability material, facing said magnetic cores and adapted to move in perfect parallelism with the plane in which said magnetic cores lie so that the inductance changes will follow a predetermined and reproducible law.

According to a feature of the invention, the rigid center is provided with receiving seats for the elements of high magnetic permeability material so as to avoid any contact of these elements with the chamber walls or the magnetic cores.

Preferably the sensor housing is formed of two half-housings defining therebetween the chamber in which the measuring diaphragm is fitted, which diaphragm separates the chamber in two half-chambers, at least a half-housing having the magnetic cores in the associated half-chambers facing the measuring diaphragm and cooperating with the rigid center or the elements of high magnetic permeability material.

Alternatively, each of the half-housings is provided with the magnetic cores fitted in the associated half-chamber and cooperating with the rigid center of the elements of high magnetic permeability material which are arranged on opposite sides of the rigid center.

According to a further feature of this invention the chamber containing the measuring diaphragm is provided with abutting surfaces intended to contact both the rigid center and the measuring diaphragm in order to avoid any danger of inelastic deformation of the measuring diaphragm and of contact of the elements of high magnetic permeability material with the chamber walls, in the case when a overpressure occurs.

Preferably, the measuring diaphragm is a flat, unshaped diaphragm.

Advantageously the elements of high magnetic permeability material are discs or the like of Permalloy, Mumetal, ferrite, the latter being preferred since it also exhibits a high ohmic resistance.

With the provision of a rigid center or the elements of a high magnetic permeability material fitted in the rigid center, a decisive increase of magnetic flux is obtained since almost all the eddy-currents are eliminated so as to have an output signal of such a value as to require a very simple processing electronic circuit as compared with that usually required for the devices of this kind. Further, a substantial conformity to the inductance laws of the response is obtained since the rigid center has surfaces moving always parallel to the magnetic cores fitted in the housing or the half-housings, respectively.

DESCRIPTION OF THE PREFERRED EMBODIMENT

Figure 1:
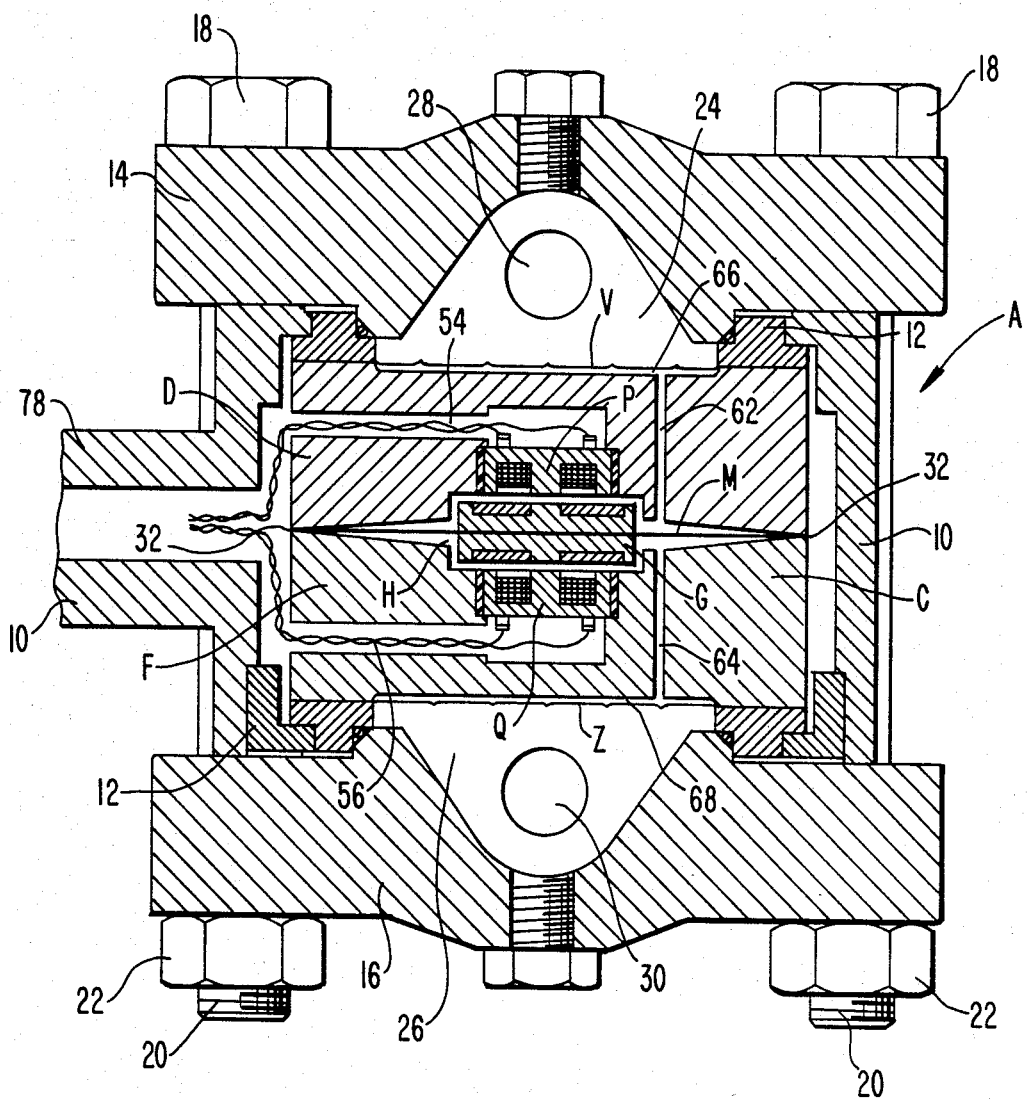
FIG. 1 shows a diametral cross-section of the transmitter according to the invention provided with a flat, unshaped measuring diaphragm when the flat, unshaped diaphragm is at rest.

Referring now to the accompanying drawings there is shown an instrument according to the invention for transmitting the value of the process fluid pressure. A designates the electromechanical section including the flat, unshaped measuring diaphragm, while B designates the dectronic circuit connected to the section A and enabling the pressure changes to be indicated.

The apparatus A consists of a central block-unit C formed of a pair of equal and symmetrically opposed half-housings D-F containing the movable sensing element G, said half-housings being fastened to each other in a sealed relationship as will be described later. The block C is fastened and clamped by means of a suitably shaped external sleeve 10 which bears against said block-unit C through contact means 12. The assembly described above is rigidly locked together by the provision of opposite closing flanges 14-16 that are clamped against each other with the aid of bolts 18, on the protruding free ends 20 of which nuts 22 are screwed. Each of the flanges 14-16 is shaped in an appropriate manner in order to define therein a chamber 24 and 26, respectively, in which input ports 28 and 30 open for the passage of process fluid in the chambers 24 and 26.

The two rigid, equal and symmetrical half-housings D-F are conformed in such a manner that, once they are coupled and sealingly fastened to each other, an intermediate chamber H will be defined within which a flat unshaped measuring diaphragm M is disposed, which is clamped and sealed between said half-housings all along its perimeter 32. In the embodiment shown, when the measuring diaphragm M—which also has very reduced thicknesses, while still maintaining its own elastic characteristics—is in its rest position as illustrated in the derawings, it exactly divides the chamber H into two halves in such a manner as to have the half-chamber H, on one side of the measuring diaphragm, and to have the half-chamber $H_2$ on the other side of the measuring diaphragm. The flat, unshaped measuring diaphragm includes a rigid center N which consists of a block accurately centered with respect to the middle point of said measuring diaphragm.

This rigid center N, is provided on its main, opposite surfaces 34 and 36 that are parallel to the measuring diaphragm M, with disc shaped means 38 and 40, respectively, made of a material exhibiting high magnetic permeability each of said discs being inserted in a recess 42 and 44 respectively, formed in the rigid center N, where each disc 38 and 40 is suitably secured in place. The discs 38, 40 are made of ferrite, Permalloy, Mumetal or other similar magnetic material, the ferrite being preferred due to its high magnetic permeability and high ohmic resistance, permitting the eddy-currents to be made negligible.

The above discs 38 and 40 cooperate with magnetic cores P and Q, respectively, each of which is fitted in a corresponding recess in the respective half-housing D-F. Each of the magnetic cores P-Q is in the form of a cup and has its pole pieces 46-48 rounded off, in order to better conform the distribution of the magnetic fields generated as will be discussed hereinafter.

The pole pieces 46 and 48 of the magnetic cores P-Q are facing the shaped chamber H. More specifically, the pole pieces 46 are facing the half-chamber H1, and the pole pieces 48 are facing the half-chamber H2. The toroidal cavities 50 and 52 of the magnetic cores P-Q house an electric winding or coil R and S respectively, the leads 54, 56 of each coil being connected to a respective AC voltage source (not shown) in order to produce a corresponding magnetic field whose flux lines will close through the nmagnetic core P and the corresponding magnetic disc 38, in the same manner as is the case with the magnetic flux generated by the coil S whose lines of flux will close through the magnetic core Q and the disc 40. In this way, two magnetic circuits are produced which, with the different components of the apparatus in the electrical and mechanical balance positions and therefore with the measuring diaphragm in its rest position, in which it divides the chamber H into two halves have the same electromagnetic values. Each of the magnetic circuits closes upon itself through the air gaps $T_1$ and $T_2$, respectively, the dimensions of the two air gaps being the same, when the measuring diaphragm M is at rest. Numerals 58 and 60 designate two rings made of a non-magnetic material, which are fitted over the coils R-S, and are secured with the aid of a resin in corresponding openings, facing the chamber H, of the cavities 50 and 52; said rings 58 and 60 are intended to prevent dispersions of magnetic flux and, thus, to prevent said magnetic flux from showing non-uniformities between the pole pieces, thereby increasing both the sensitivity and the linearity of the sensor.

From the shaped chamber H, a pair of conduits 62 and 64 of very small sections are derived; these conduits open at their internal ends into the chamber H and at their external ends into gaps 66 and 68 which are delimited towards the interior, by sealed diaphragms V and Z, respectively, that are suitably welded to corresponding portions of the half-housings D-F, and sealed with respect thereto.

Chamber H, conduits 62 and 64 and gaps 66 and 68 are filled with a so-called filling-fluid, in the example shown a silicone oil, which fills up all of the cavities described above. This filling-fluid is isolated from the process-fluid flowing in chambers 24 and 26 due to the provision of the sealed diaphragms V-Z which are provided to completely prevent any admixture of the two fluids from taking place.

70 and 72 designate layers of a thermosetting resin which have been provided for securing the inductive elements, namely the magnetic cores P-Q and their coils R-S, as well as the rings of non magnetic material 58–60, whereas numerals 74 and 76 designate the lead-in for connecting the electric wires 54 and 56, respectively. With 78 there is shown the portion of the apparatus A used for connecting same with the electronic circuit B and more specifically, the section for the passage of wires 54 and 56 to both the voltage source and the electronic circuit.

From the above, it should be readily apparent that operation of the transmitter A is as follows:

Assuming that the coils R-S are energized and that two equal magnetic fields are induced because the measuring diaphragm M is assumed to be in its rest position where it exactly divides the chamber H into two halves-said circuits closing on the discs 38 and 40. For this inoperative conditions there will, obviously, be a corresponding balance condition of the pressure of the process-fluid in chambers 24 and 26, so that the pressure exerted by the fluid in chamber 24 on the sealed diaphragm V is exactly the same as that exerted by the process-fluid in chamber 26 on the sealed diaphragm Z. As a result, the pressures transmitted by the sealed diaphragms V-Z to the filling-fluid in said circuit, are equal and opposite to each other so that the measuring diaphragm M remains in a balanced condition along with its rigid center N.

Figure 2:
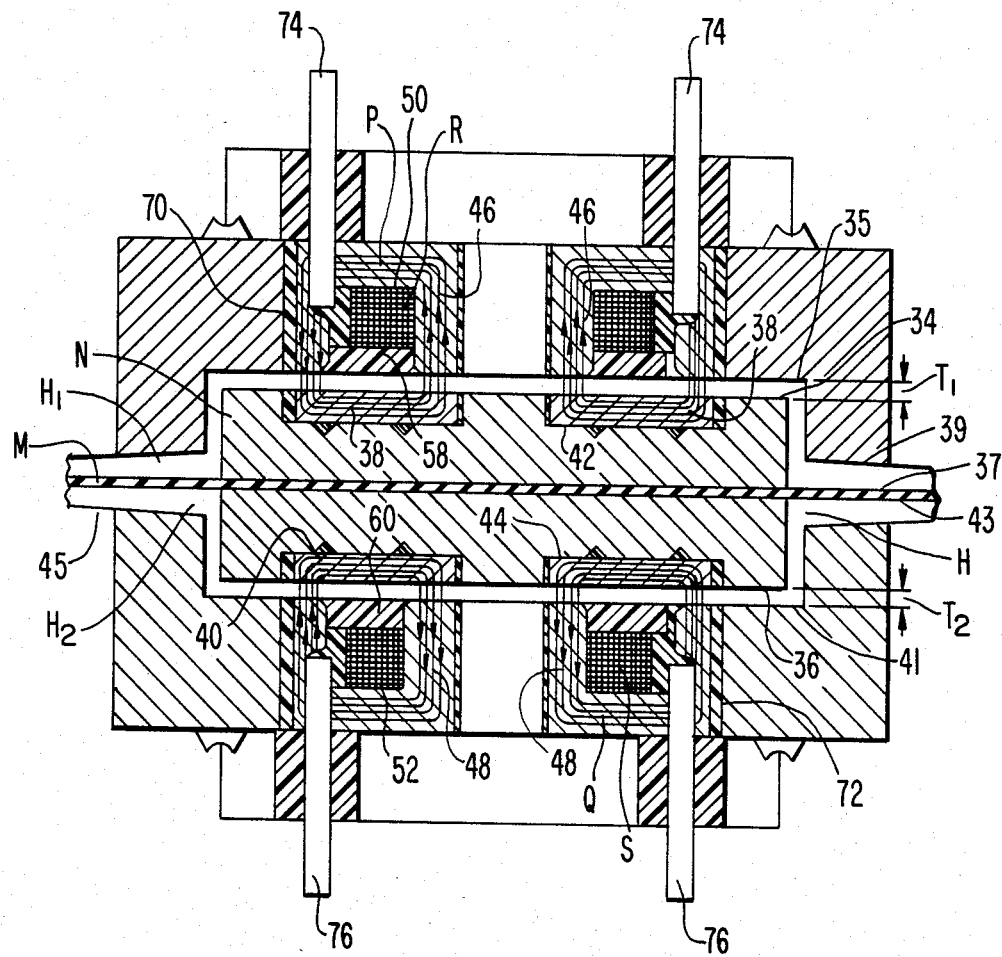
FIG. 2 is a view in a greater scale of the instrument in FIG. 1, but only related to the half-housings and the sensing device.

Assuming now that the pressure of the process-fluid in chamber 24 is being increased with respect to the pressure in chamber 26; then, this difference of pressures will be transmitted immediately to the filling-fluid and, as a result, will be transmitted to both the measuring diaphragm M and its center N. In practice, by taking into account the structural feature of the apparatus, the increased pressure in 24 will cause (see FIGS. 1 and 2) the measuring diaphragm M along with its center N to be displaced downwardly a given distance, due to a corresponding displacement of the sealed diaphragm V. In a like manner, the outer sealed diaphragm Z will also move downwardly. The gap 66 will decrease in volume and, likewise, the half-chamber H1 will have its volume increased, and the half-chamber H2 will have its volume decreased.

From a magnetic standpoint, the air gap T1 will increase, while the air gap T2 will decrease. As a result, the reluctance of the magnetic circuit of coil R will be increased while the reluctance of magnetic circuit of coil S will be decreased. According to the law $L = N^2/R$, where L is the inductance of a coil and N is the number of coil turns and R is the reluctance of the magnetic circuit, as the reluctance of the first circuit increases, its inductance correspondingly decreases, and the converse is also true.

This condition of the transformation of the pressure values into displacement values of the measuring diaphragm and of these latter into inductance values, will finally result in the generation of electromagnetic signals which, from wires 54 and 56, are entered into the circuit B where said signals are suitably processed, as will be discussed later, thereby giving a definitive indication of the value of the differential pressure existing in the process fluid in chambers 24 and 26, at the given time. It is clear that successive occurring of changes in the pressure of the process-fluid, will have immediate effects on the filling-fluid and thus on the measuring diaphragm M, which will be correspondingly displaced, thereby causing the air gaps, and therefore the inductance of the two magnetic circuits, to be changed in value accordingly.

It should be apparent that the above assumed case of increased pressure in chamber 24, and thus of increased magnitude of the air gap T1, with corresponding inductance decrease of the magnetic circuit derived from coil R, may also apply to chamber 26, in which case there will be a magnitude increase of the air gap T2 and inductance decrease from coil S.

As already stated, during operation of the apparatus A, there will be a sequence of changes in pressure of the process-fluid in chambers 24 and 26 and, as a result, a sequence of differential pressure values that will be supplied to the electronic circuit B, where these values are processed to give a succession of indications of the effective value of the differential pressures which are continuously occurring in the chamber H and, thus, in the process-fluid.

The apparatus will therefore measure differential pressures even when a high static pressure is involved, but it will measure both relative and absolute pressures, too.

If an overpressure, or a so-called over-range pressure, should take place, then such an anomalous condition would not affect at all the apparatus due to the peculiar structure thereof.

Practically, should the overpressure take place in chamber 26, it would cause the measuring diaphragm M, and, consequently, its rigid center N, to be moved up to the end of the upward travel thereof, so that the main face 34 of the center N would be brought into contact with the opposite face 35 of the half-chamber H1, while the top face 37 of the measuring diaphragm M would be brought into close contact with the face 39 of the same half-chamber. It clearly appears that, in this way, the air gap T1 will be suppressed, but with no permanent deformation being induced in the measuring diaphragm M, which will maintain its normal elastic properties unchanged. When said overpressure has come to an end and the pressure-fluid has resumed its balance condition, then the measuring diaphragm M will come back to the position shown in the drawings.

The reverse will apply to the case where overpressure occurs in chamber 24, since the rigid center N will then be moved to the end of its downward travel, so that the face 36 of said center N will be pressed against the face 41 of the half-chamber H2, while the face 43 of the measuring diaphragm M will be pressed against the face 45 of said half-chamber, thereby suppressing the air gap T2.

In the first case of overpressure described above, the seal diaphragm Z will be urged toward the corresponding external face of the half-housing F without being subjected to any permanent deformation, while the interspace 68 will be reduced in volume without being suppressed. Likewise, when an overpressure occurs in chamber 24, the seal diaphragm V is moved toward the corresponding face of the half-housing D.

In this way, possible end-of-travel conditions of the rigid center N may not give rise to corresponding conditions of permanent deformation in the movable components of the instrument, since there is a cushion of filling-fluid consistently maintained in the interspaces 66 and 68, owing to the particular and calcuated amount of the filling-fluid that is admitted to the circuits 66, 62, H, 64 and 68. Thus, the occurrence of permanent deformation in diaphragms V, M, Z, is, in any case, to be excluded.

The basic principle of the invention according to which the transmitter A is so constructed as to include a flat, unshaped measuring diaphragm whose displacement in the associated filling-fluid chamber causes the reluctance of the magnetic circuit, and thus its inductance to be continuously changed, may lend itself to many different embodiments. For example, it is not to be excluded that, rather than two half-chambers, the sensor may have a single chamber filled with the filling-fluid, in which case only a single magnetic circuit will be provided, so that if the other half-chamber is communicated to the atmosphere, the measure, rather than in connection with a differential pressure value, will be related to a value of relative pressure, and if the outer half-chamber is under vacuum, the measure will be related to a value of absolute pressure.

The rigid center N has greater sizes as compared with the thickness of the measuring diaphragm M, this being principally for reason of mechanical stability, since any deformation of the magnetic discs 38 and 48 carried by said center N has to be prevented in an absolute manner. It is not excluded, however, that any other appropriate means, which is indeformable and of reduced sizes, may be substituted for the above rigid center. For example, the rigid center N may be replaced by a suitable thin plate entirely made of material exhibiting high magnetic permeability.

The features of the invention may be summarized as follows:

(1) The sensor is of the inductive type, that is to say one which changes its reluctance;

(2) The transformation of the pressure values into electrical signals is carried out by means of a measuring diaphragm having a rigid center made of a high magnetic permeability material, the movement of which is proportional to the pressure to be measured.

(3) The measuring diaphragm is fastened to the housings which are between two half-housing equal and symmetrical with respect to the measuring diaphragm and the housing; each of the half-housings or both the half-housings carry an associated coil with a magnetic core which constitutes the inductive measuring element, whose value of inductance is a function of the air-gap between the core and the rigid center of the measuring diaphragm.

(4) Since the distance of the measuring diaphragm to the magnetic cores changes as the pressure of the process-fluid changes, a change is obtained in inductance of a so great value as to be used to generate an electrical signal which is subject to the subsequent amplification and transmission. In the example shown, two inductive elements are used, one on each side of the measuring diaphragm, so that when the value of one inductance increases, that of the other inductance decreases.

(5) There is a safe protection system against overpressure which is obtained by the abutment of the measuring diaphragm and the rigid center thereof in case of overpressure against the inner abutment surface of the housing or half-housing(s); the contours of the housing or half-housing are so designed as to fit precisely to each other; the pressure force, which does not deform the measuring diaphragm, is supported entirely by the mechanical structure which is designed to serve this purpose.

(6) The measuring diaphragm has a rigid center for carrying magnetic discs which improve both the sensitivity and configuration of the magnetic flux by reducing the eddy-corrents and positively affecting the linearity and the strength of the generated signal.

Figure 3:
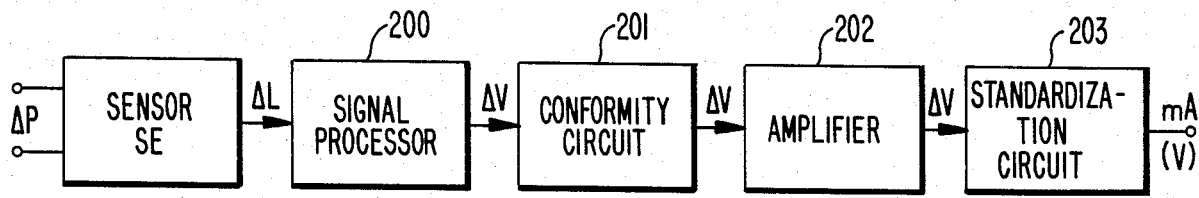
FIG. 3 is a block diagram of the electronic circuit in which the signals received from the sensor are processed in order to standardize them in accordance with the standards required for the transmitters.

As mentioned above, the values of the inductance are processed in an electronic circuit of the type as shown in FIG. 3.

This circuit is generally comprised of a block 200 connected to the sensor SE, where the differential pressure $\Delta P$ applied to the inputs thereof is converted into the inductance changes $\Delta L$ hereinbefore referred to. In the block 200 the signal in terms of $\Delta L$ is processed and conditioned so as to give as its output a signal in terms of dc. or ac. voltage which is supplied to the conformity block 201, where it is linearized so as to give as its output a perfect linear signal in terms of d.c. voltage which is then amplified in the adjustable amplifier block 202 whose output is standardized in the block 203 so as to give signals preferably in terms of mA of current in accordance with the international standards required for the industrial process measuring transmitters.

Figure 4:
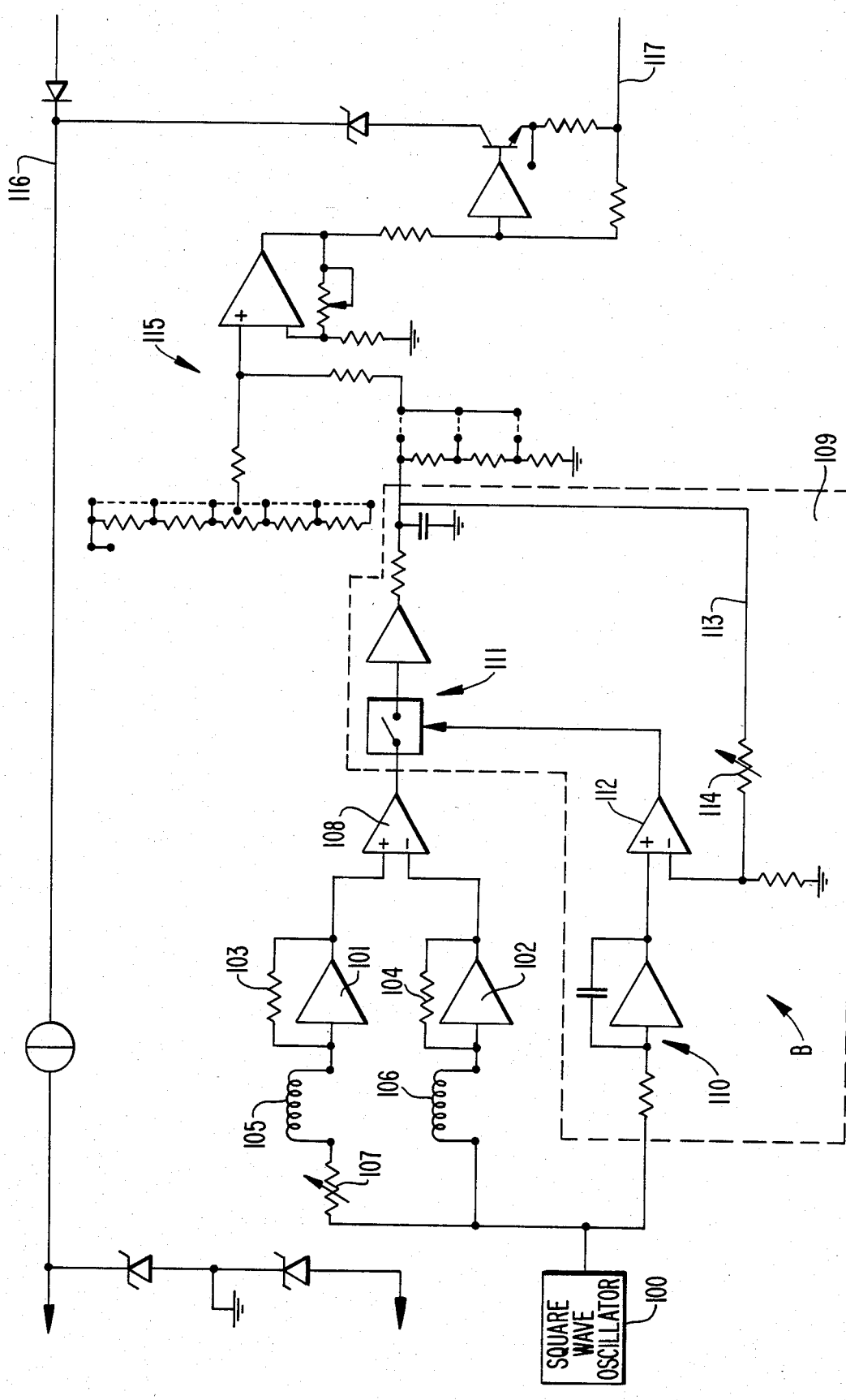
FIG. 4 shows one of the possible embodiments of the circuit of FIG. 3.

FIG. 4 shows one of the possible embodiments of this circuit as applied to a transmitter for measuring differential pressures of the process fluids.

This circuit is controlled by a square wave oscillator 100 that drives two basic elements of said electronic circuit; said basic elements are each comprised of an integrator formed of operational amplifiers 101 or 102, and fixed, negative feedback resistor 103 or 104, and variable inductances 105 or 106. A variable resistor 107 is provided which enables the circuit to be calibrated. The two inductances 105 and 106 are generated by the coils R-S, and are the inductances of the measuring device A; said inductance are of the same value with the device at rest, while every displacement of the measuring diaphragm M in the device A will cause a change which is opposite in sign to occur in both of the inductances 105 and 106.

The outputs from the integrators are supplied to a comparator 108 which in turn will supply a linearizer-rectifier circuit 109, driven through an integrator 110 controlling the rectifier proper 111 by input-driving a switch with a combination of opening and closing operations synchronously occurring in succession. The signal from the integrator 110 passes to a comparator 112 along with a portion of the continuous output signal, which is fed back, through line 113 and an adjusting resistor 114, so as to introduce a nonlinear component that will compensate for any lack of linearity of the signal at the output from comparator 108.

The output signal from the rectifier is passed to the amplification stage generally designated by 115, which provides for span and zero adjustments, and then to a standardizing circuit so as to give as its output a current, typically of 4 to 20 mA (standard for transmitters), indicative of the differential pressures in the apparatus.

As a matter of fact, the details of construction and the way this latter is carried into effect may vary in any case without departing from the spirit and scope of the invention.

What is claimed is:

1. An electronic transmitter for transmitting pressure values of fluids used in industrial processes, said transmitter formed of a housing having a measuring diaphragm fastened thereto and defining therewith a chamber, said chamber and diaphragm being subjected to the pressure of the process fluid, magnetic cores facing the measuring diaphragm for inducing a magnetic field, said cores having an inductance which changes in correspondance with air gap changes which occur between the measuring diaphragm and the magnetic cores due to movement of the measuring diaphragm, said inductance changes being processed in an electronic circuit for indicating the pressure value acting at that time on the measuring diaphragm, wherein said measuring diaphragm is provided with a rigid center which is either formed of or carries at least one element of a material exhibiting a high magnetic permeability, said rigid center facing said magnetic cores and moving in an exact parallel relationship with the plane in which said magnetic cores lie so that the inductance changes occur in accordance with a predetermined and reproducible law.

2. An electronic transmitter as claimed in claim 1, wherein said rigid center is provided with seats for receiving said at least one element of material exhibiting a high magnetic permeability so as to avoid any contact of said at least one element with the chamber walls or with the magnetic cores.

3. An electronic transmitter as claimed in claim 1, wherein said housing is comprised of a pair of half-housings defining therebetween said chamber in which the measuring diaphragm is fitted, said diaphragm separating said chamber into a pair of half-chambers, at least one of said half-housings having said magnetic cores fitted in one of said half-chambers which are facing the measuring diaphragm and respectively cooperating with said rigid center or said at least one element of the material exhibiting high magnetic permeability so as to obtain a measurement of gauge pressure or, in the case when one half-chamber is evacuated, so as to obtain a measurement of the absolute pressure.

4. An electronic transmitter as claimed in claim 3, wherein each of said half-housings has said magnetic cores fitted in the associated half-chamber which are facing the measuring diaphragm and cooperating with the rigid center of said at least one element of a material exhibiting high magnetic permeability which have been fitted on the opposite sides of said rigid center, so as to obtain a measurement of differential pressures.

5. An electronic transmitter as claimed in claim 1, wherein said diaphragm containing chamber is provided with abutment surfaces intended to contact both the rigid center and the measuring diaphragm in order to respectively avoid any danger of an elastic deformation of the measuring diaphragm and of contact of said elements of a material exhibiting high magnetic permeability with the chamber walls when an overpressure is occurring.

6. An electronic transmitter as claimed in claim 1, wherein said measuring diaphragm is geometrically flat and unshaped and is locked in said chamber in a prestressed condition, when it is formed of a thin sheet of elastic material, or in a non stressed condition when it is formed of a disc of properly machined elastic material.

7. An electronic transmitter as claimed in claim 1, wherein said element of a material exhibiting high magnetic permeability are discs of one of either Permalloy, Mumetal and ferrite.

8. An electronic transmitter as claimed in claim 1, wherein said electronic circuit for processing output signals from the magnetic cores includes a processing and conditioning circuit, the output of which is supplied to a conformity circuit and then to an amplifying circuit the output of which is supplied to a standardizing circuit in order to output a signal in accordance with the standards required for the industrial process measuring transmitters.

9. An electronic transmitter as claimed in claim 8, wherein said processing circuit includes an integrating circuit comprising an operational amplifier and at least one feedback resistor for generating an output signal representing the integral of square wave signals supplied to the integrator.

10. An electronic transmitter as claimed in claim 9, wherein the output signals from said integrator are supplied to a differential amplifier means for forming the differences of the integrated signal and to a rectifying circuit including a synchronous switch driven by the square wave input signal in order to determine the differences of the pressures to be selected.

11. An electronic transmitter as claimed in claim 10, wherein said rectifying circuit includes a linearization circuit for modifying the operative conditions of said switch in an adjustable manner and on the basis of a continuous feedback signal from the rectifier output by introducing a non-linear signal component which compensates for any non-linearity of the input signal to said switch.

12. An electronic transmitter for transmitting pressure values of fluids used in industrial processes, said transmitter formed of a housing having a measuring diaphragm fastened thereto and defining therewith a chamber, said chamber and diaphragm being subjected to the pressure of the process fluid, magnetic cores facing the measuring diaphragm for inducing a magnetic field, said cores having an inductance which changes in correspondance with air gap changes which occur between the measuring diaphragm and the magnetic cores due to movement of the measuring diaphragm, said inductance changes being processed in an electronic circuit for indicating the pressure value acting at that time on the measuring diaphragm, wherein said measuring diaphragm is provided with a rigid center which is either formed of or carries at least one element of a material exhibiting a high magnetic permeability, said rigid center facing said magnetic cores and moving in an exact parallel relationship with the plane in which said magnetic cores lie so that the inductance changes occur in accordance with a predetermined and reproducible law;

wherein said rigid center is provided with seats for receiving said at least one element of material exhibiting a high magnetic permeability so as to avoid any contact of said at least one element with the chamber walls or with the magnetic cores;

wherein said housing is comprised of a pair of half-housings defining therebetween said chamber in which the measuring diaphragm is fitted, said diaphragm separating said chamber into a pair of half-chambers, at least one of said half-housings having said magnetic cores fitted in one of said half-chambers which are facing the measuring diaphragm and respectively cooperating with said rigid center or said at least one element of the material exhibiting high magnetic permeability so as to obtain a measurement of gauge pressure or, in the case when one half-chamber is evacuated, so as to obtain a measurement of the absolute pressure;

wherein each of said half-housings has said magnetic cores fitted in the associated half-chamber which are facing the measuring diaphragm and cooperating with the rigid center or said at least one element of a material exhibiting high magnetic permeability which have been fitted on the opposite sides of said rigid center, so as to obtain a measurement of differential pressures;

wherein said diaphragm containing chamber is provided with abutment surfaces intended to contact both the rigid center and the measuring diaphragm in order to respectively avoid any danger of an elastic deformation of the measuring diaphragm and of contact of said elements of a material exhibiting high magnetic permeability with the chamber walls when an overpressure is occurring;

wherein said measuring diaphragm is geometrically flat and unshaped and is locked in said chamber in a prestressed condition, when it is formed of a thin sheet of elastic material, or in a non stressed condition when it is formed of a disc of properly machined elastic material.

* * * * *